US010920695B1

(12) United States Patent
Bogema et al.

(10) Patent No.: US 10,920,695 B1
(45) Date of Patent: Feb. 16, 2021

(54) METHODS AND SYSTEMS FOR REGENERATION OF AN EXHAUST AFTERTREATMENT DEVICE

(71) Applicant: Ford Global Technologies, LLC, Dearborn, MI (US)

(72) Inventors: John Paul Bogema, Flat Rock, MI (US); Joseph Goode, Northville, MI (US); Kirk Andrew Parrish, Grass Lake, MI (US); Peter Mitchell Lyon, Brighton, MI (US); Sanket Anil Gujarathi, Canton, MI (US); William Clifford Brown, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/562,351

(22) Filed: Sep. 5, 2019

(51) Int. Cl.
| | | |
|---|---|---|
| F02D 41/02 | (2006.01) | |
| F01N 11/00 | (2006.01) | |
| F01N 3/025 | (2006.01) | |
| F01N 3/10 | (2006.01) | |
| F02P 5/04 | (2006.01) | |
| F01N 3/035 | (2006.01) | |
| F02P 5/15 | (2006.01) | |

(52) U.S. Cl.
CPC ......... *F02D 41/029* (2013.01); *F01N 3/0253* (2013.01); *F01N 3/035* (2013.01); *F01N 3/103* (2013.01); *F01N 11/002* (2013.01); *F01N 11/007* (2013.01); *F02D 41/025* (2013.01); *F02P 5/045* (2013.01); *F02P 5/151* (2013.01)

(58) Field of Classification Search
CPC ....... F01N 3/023–0296; F01N 2430/08; F02D 41/029
USPC .......... 60/311, 273, 274, 284–287, 291, 295, 60/297, 320
See application file for complete search history.

(56) References Cited

U.S. PATENT DOCUMENTS

| | | | | |
|---|---|---|---|---|
| 4,075,992 A | * | 2/1978 | Linder | .................. F02B 77/086 123/568.16 |
| 4,130,098 A | * | 12/1978 | Linder | .................. F02B 77/086 123/698 |
| 4,671,059 A | * | 6/1987 | Lawson | ................ F01N 13/011 60/309 |
| 4,685,291 A | * | 8/1987 | Ha | .......................... F01N 3/033 60/286 |
| 4,730,455 A | * | 3/1988 | Pischinger | ............ F01N 3/0256 55/283 |
| 5,246,205 A | * | 9/1993 | Gillingham | ............. F01N 1/006 251/334 |

(Continued)

FOREIGN PATENT DOCUMENTS

| | | | | |
|---|---|---|---|---|
| JP | 06272536 A | * | 9/1994 | |
| JP | 11125109 A | * | 5/1999 | |

(Continued)

*Primary Examiner* — Mark A Laurenzi
*Assistant Examiner* — Mickey H France
(74) *Attorney, Agent, or Firm* — Geoffrey Brumbaugh; McCoy Russell LLP (57) ABSTRACT

Methods and systems are provided for regenerating an aftertreatment device of a vehicle. In one example, a method may include adjusting conditions of the regeneration in response to a stickiness of the exhaust valve. Adjusting conditions may include adjusting an air/fuel ratio and/or a post-injection amount.

20 Claims, 6 Drawing Sheets

(56) References Cited

U.S. PATENT DOCUMENTS

| | | | | |
|---|---|---|---|---|
| 6,588,201 | B2 * | 7/2003 | Gillespie | F02M 25/06 60/283 |
| 8,341,947 | B2 | 1/2013 | Hepburn et al. | |
| 8,423,269 | B2 * | 4/2013 | Harden | F02M 26/50 701/108 |
| 8,707,680 | B2 * | 4/2014 | Bisaiji | B01D 53/9422 60/285 |
| 2004/0261374 | A1 * | 12/2004 | Bailey | F01N 3/0842 55/302 |
| 2005/0217245 | A1 * | 10/2005 | Haseyama | F01N 3/0253 60/278 |
| 2005/0223697 | A1 * | 10/2005 | Onodera | F02D 41/005 60/278 |
| 2006/0048505 | A1 * | 3/2006 | Takahashi | F01N 3/106 60/295 |
| 2006/0168941 | A1 * | 8/2006 | Pfaeffle | F01N 3/0871 60/274 |
| 2007/0277509 | A1 * | 12/2007 | Tahara | F02D 41/1467 60/286 |
| 2007/0289287 | A1 * | 12/2007 | Tahara | F01N 13/009 60/277 |
| 2008/0148720 | A1 * | 6/2008 | Tahara | F01N 3/2006 60/295 |
| 2008/0209887 | A1 * | 9/2008 | Hanari | F02B 39/16 60/277 |
| 2009/0076716 | A1 * | 3/2009 | Han | F01N 3/106 701/115 |
| 2009/0151337 | A1 * | 6/2009 | Tornambe | F01N 3/0238 60/295 |
| 2009/0229251 | A1 * | 9/2009 | Kadowaki | F01N 3/0814 60/276 |
| 2010/0024395 | A1 * | 2/2010 | Gotou | F01N 3/023 60/277 |
| 2010/0050612 | A1 * | 3/2010 | Dyrbusch | F01N 9/002 60/286 |
| 2010/0064686 | A1 * | 3/2010 | Mondori | F02M 26/15 60/605.2 |
| 2010/0139254 | A1 * | 6/2010 | Sebestyen | F01N 11/00 60/286 |
| 2011/0131957 | A1 * | 6/2011 | Hepburn | F01N 3/021 60/278 |
| 2011/0146267 | A1 * | 6/2011 | Hepburn | F01N 3/021 60/602 |
| 2011/0146269 | A1 * | 6/2011 | Hepburn | F02D 41/0007 60/602 |
| 2012/0090303 | A1 * | 4/2012 | Numata | F01N 3/0871 60/287 |
| 2014/0000242 | A1 * | 1/2014 | Hepburn | F01N 3/021 60/274 |
| 2016/0138526 | A1 * | 5/2016 | Peters | F02M 25/06 123/559.1 |
| 2018/0003095 | A1 * | 1/2018 | Asaura | F01N 3/2066 |
| 2018/0003100 | A1 * | 1/2018 | Asaura | F01N 13/011 |
| 2018/0119652 | A1 * | 5/2018 | Dixon | F02D 41/26 |
| 2018/0171908 | A1 * | 6/2018 | Ulrey | F02D 41/26 |
| 2019/0176810 | A1 * | 6/2019 | Dudar | F02D 41/221 |
| 2019/0178190 | A1 * | 6/2019 | Dudar | F02M 35/1038 |

FOREIGN PATENT DOCUMENTS

| | | | |
|---|---|---|---|
| JP | 3541665 | B2 | 7/2004 |
| JP | 3713923 | B2 * | 11/2005 |
| JP | 6252997 | B1 * | 12/2017 |

* cited by examiner

METHODS AND SYSTEMS FOR REGENERATION OF AN EXHAUST AFTERTREATMENT DEVICE

FIELD

The present description relates generally to adjusting regeneration conditions of an exhaust aftertreatment device in response to an exhaust gas mixture composition.

BACKGROUND/SUMMARY

Vehicle are equipped with aftertreatment devices configured to reduce, oxidize, and/or capture emissions resulting from combustion. Over time, these aftertreatment devices may need a regeneration in the form of clearing trapped particulates or regenerating a catalyst of the aftertreatment device.

One example of the above described regeneration includes regeneration of a particulate filter, which may be arranged in an exhaust passage to capture particulate matter, thereby blocking particulates from flowing to an ambient atmosphere. To regenerate the particulate filter, exhaust gas temperatures are elevated to a temperature sufficient to begin burning the particulate matter stored on the particulate filter.

Regeneration of the particulate filter may be increasingly challenging for a diesel engine vehicle as opposed to a gasoline engine vehicle. Due to the lower combustion temperatures of the diesel engine vehicle, more particulate matter may be released. Additionally, exhaust gas temperatures may not reach regeneration temperatures passively as often in the diesel engine vehicle compared to the gasoline engine vehicle. As such, to actively regenerate a diesel particulate filter, richer combustion and exhaust gas conditions may be used to increase a temperature of the particulate filter.

However, the inventors have identified some issues with the approaches described above. For example, a combination of particle matter and a post-injection of fuel may form a substance that may adhere to valve surfaces of the engine, such as surfaces of one or more exhaust valves. The substance may be relatively sticky, wherein an accumulation of the substance may block the exhaust valve from completely sealing a combustion chamber, resulting in an in-cylinder pressure decreasing and an overall engine efficiency falling. Furthermore, operation of the exhaust valve may be degraded such that opening of the valve is delayed and/or needs an increased supply of power to command the valve open. This may result in an abnormal exhaust profile and affect performance of other cylinders as well.

Thus, there is a demand for improved regeneration of a particulate filter, and in particular a diesel particulate filter to avoid the above described issues. In one example, the issues described above may be addressed by a system for a particulate filter arranged in an exhaust passage of an engine. The system comprises a controller with computer-readable instructions stored on non-transitory memory thereof that when executed enable the controller to adjust regeneration conditions of the particulate filter to decrease formation of a mixture comprising particulate matter and wet hydrocarbons in response to a stickiness of an exhaust valve. In this way, conditions during the regeneration may be adjusted to mitigate the exhaust valve sticking to a valve seat.

As one example, the regeneration may comprise a first stage, a second stage, and a third stage, where mixing of particulate matter and wet hydrocarbons from a post-injection during the second and third stages may form a substance that may accumulate onto the valve seat and surface of the exhaust valve. The substance may be a sticky (e.g., adherent and/or gummy) and viscous mixture and delay opening of the exhaust valve and block complete closing of the exhaust valve against the valve seat. As such, the conditions of the first, second, and third stages may be adjusted by increasing an air/fuel ratio to decrease particulate matter formation and decreasing a post-injection amount to decrease an amount of wet hydrocarbons. By doing this, the regeneration may be prolonged and the exhaust valve stickiness may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for regenerating a particulate filter of a vehicle. In one example, the vehicle is a hybrid vehicle, such as the vehicle illustrated in FIG. 1. Additionally or alternatively, the hybrid vehicle may be may include a diesel engine. However, it will be appreciated that the methods described herein may also apply to a spark-ignited, gasoline engines. Furthermore, the methods for regenerating the particle filter may be applied to regeneration of other exhaust treatment devices which demand elevated exhaust gas temperatures. The process in elevating such exhaust gas temperature may lead to an exhaust valve sticking and decreasing engine efficiency, as will be described herein.

The vehicle may comprise a particulate filter configured to capture particulate matter. Particulate matter may include soot, dirt, dust, and other compounds release during a combustion process. The particulate filter may capture the particulate matter. As the particulate matter accumulates on the particulate filter, exhaust backpressure may increase and affect engine performance. Additionally, the particulate filter may be less able to capture future particulate matter due to storage space on the particulate filter being used and its load being relatively high. Thus, a regeneration of the particulate filter may be desired following some duration of time since a previous regeneration or in response to the exhaust gas backpressure exceeding a threshold backpressure. A method for regenerating the particulate filter is shown in FIG. 2.

During the active regeneration, the particulate filter temperature is increased to a threshold regeneration temperature. In some examples, such as in the example of a diesel engine, the threshold regeneration temperature may be hotter than exhaust gas temperatures during a plurality of operating conditions. As such, the active regeneration may adjust engine operating parameters to increase exhaust gas temperatures, thereby heating the particulate filter to a regeneration temperature.

Figure 2:
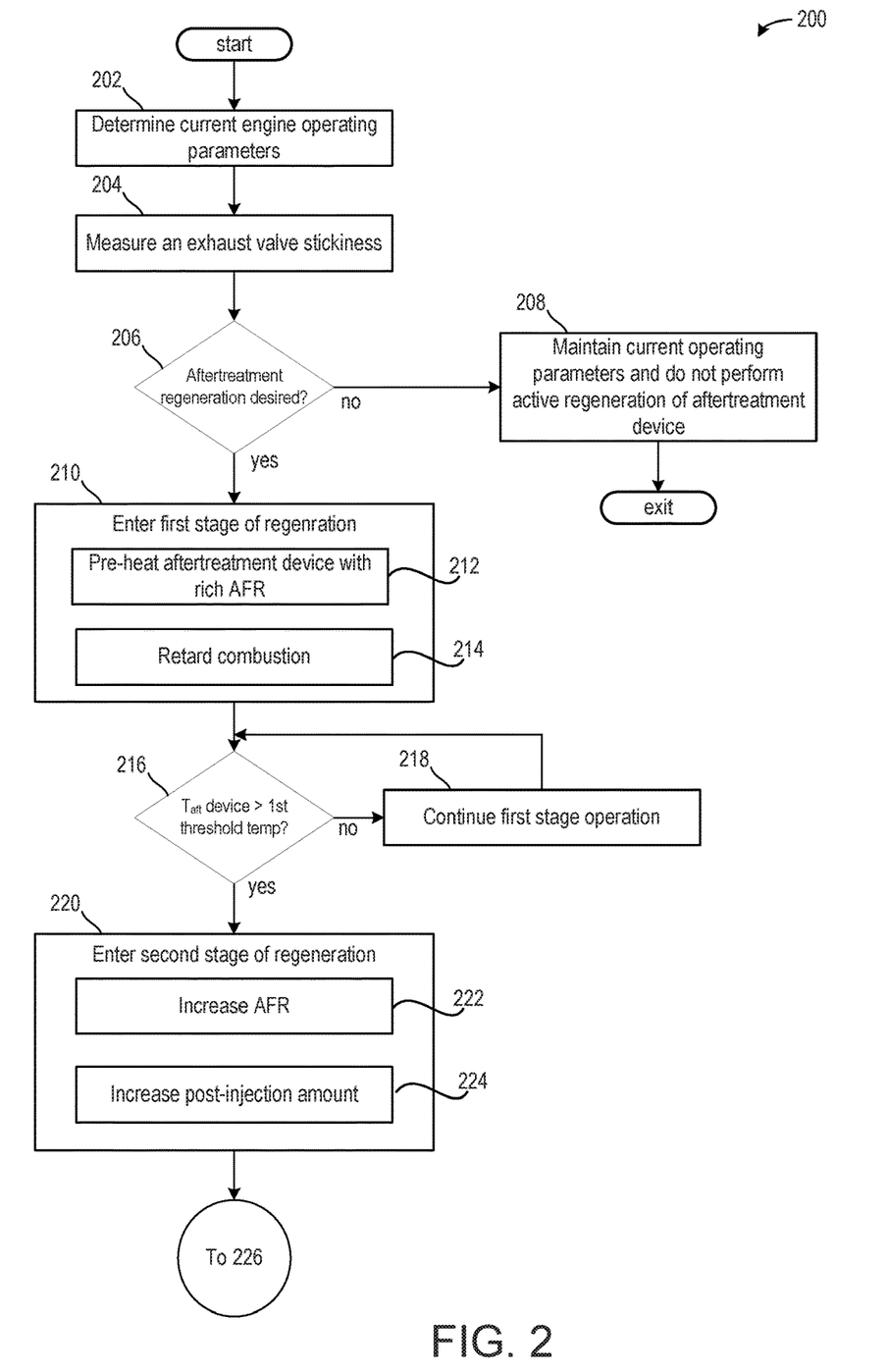
FIG. 2 shows a method for executing an active regeneration of a particulate filter based on a valve stickiness.

In the example of FIG. 2, the active regeneration comprises three stages, a first stage which operates the engine rich to increase the exhaust gas temperature to a first threshold temperature, lower than the threshold regeneration temperature. A second stage may be executed following the first stage once the first threshold temperature is achieved, wherein the second stage includes operating the engine lean and increasing a post-injection of fuel to a relatively high amount. The unburned fuel from the post-injection and excess air may react in the exhaust passage via an oxidation catalyst upstream of the particulate filter, exothermically heating exhaust gas flowing to the particulate filter. In this way, the first threshold temperature may correspond to a temperature of the oxidation catalyst being hot enough to react with the fuel and air. A third stage of the regeneration may be executed in response to the particulate filter reaching the threshold regeneration temperature during the second stage. The third stage may include operating the engine slightly rich and decreasing the post-injection amount relative to the amount during the second stage. The third stage may be configured to maintain a temperature of the particulate filter at the threshold regeneration temperature. The third stage may be further configured to adjust an amount of particulate matter mixing with the post-injection to mitigate valve stickiness. For example, the post-injection may be reduced or the air/fuel ratio may be leaned to decrease the amount of particulate matter mixing with the post-injection.

Figure 3:
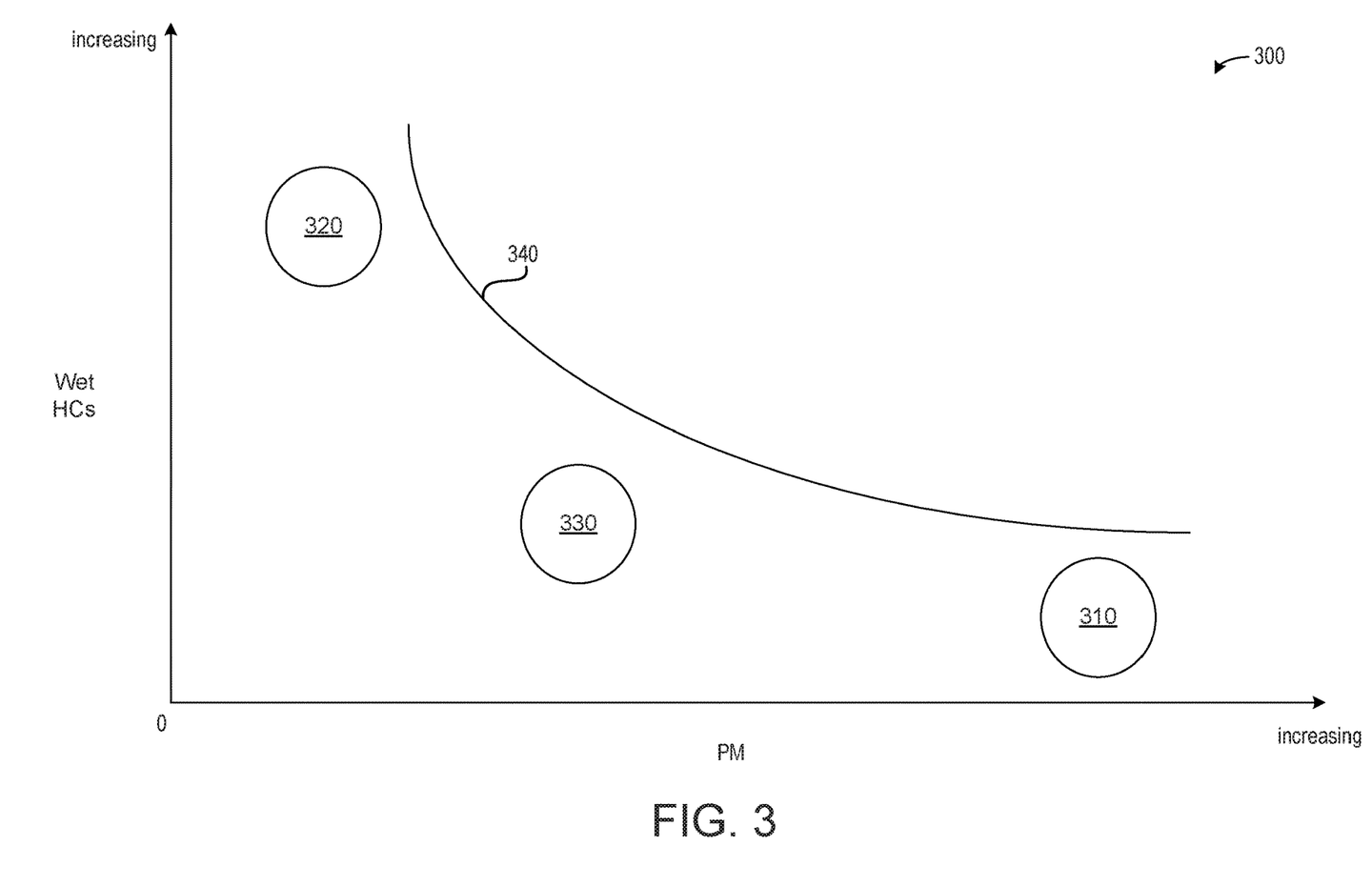
FIG. 3 illustrates a plot representing a mixture of particulate matter and wet hydrocarbons and a resulting amount of stickiness.
Figure 4:
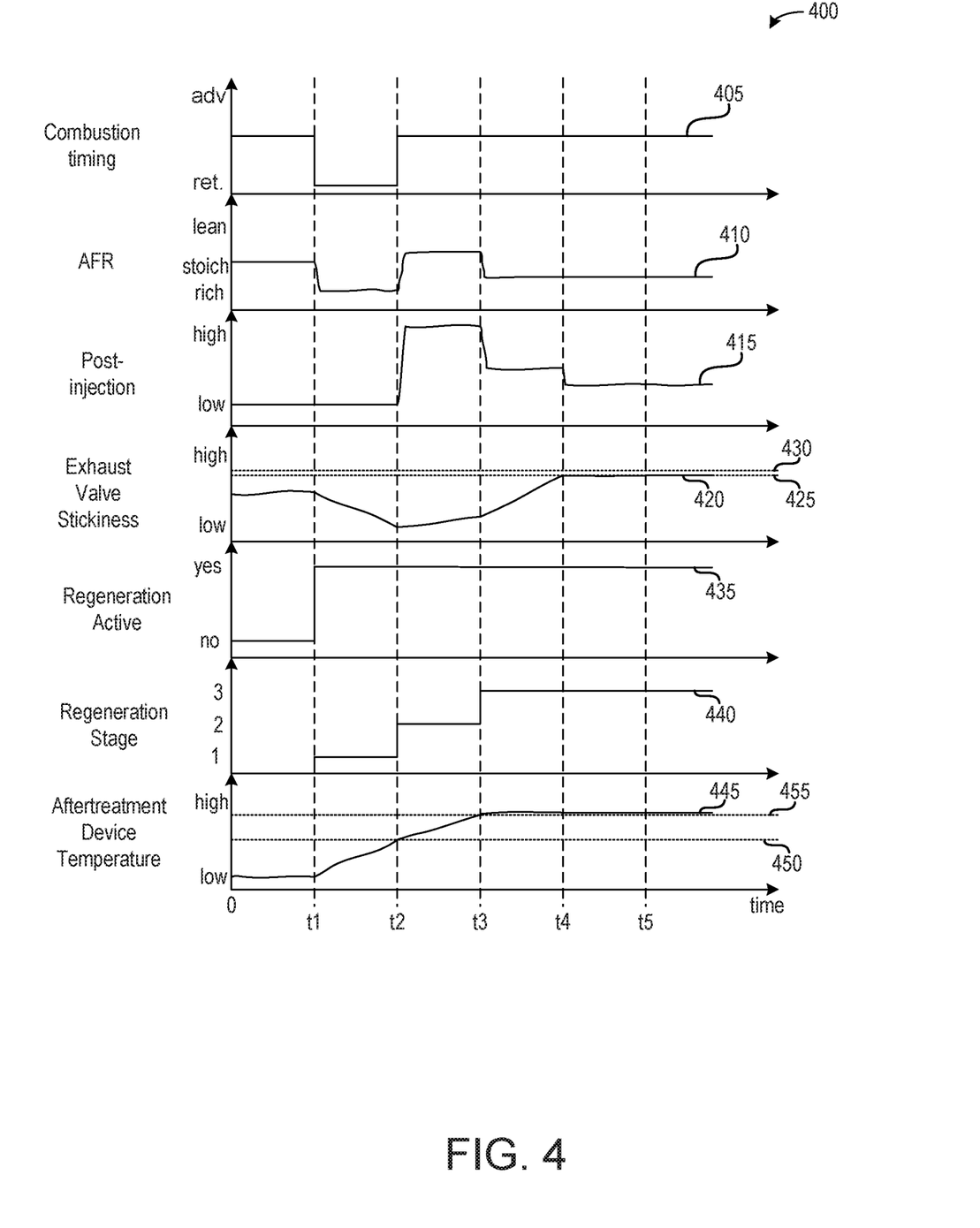
FIG. 4 illustrates a prophetic example of the method of FIG. 2 being executed with the engine arrangement of FIG. 1.
Figure 5:
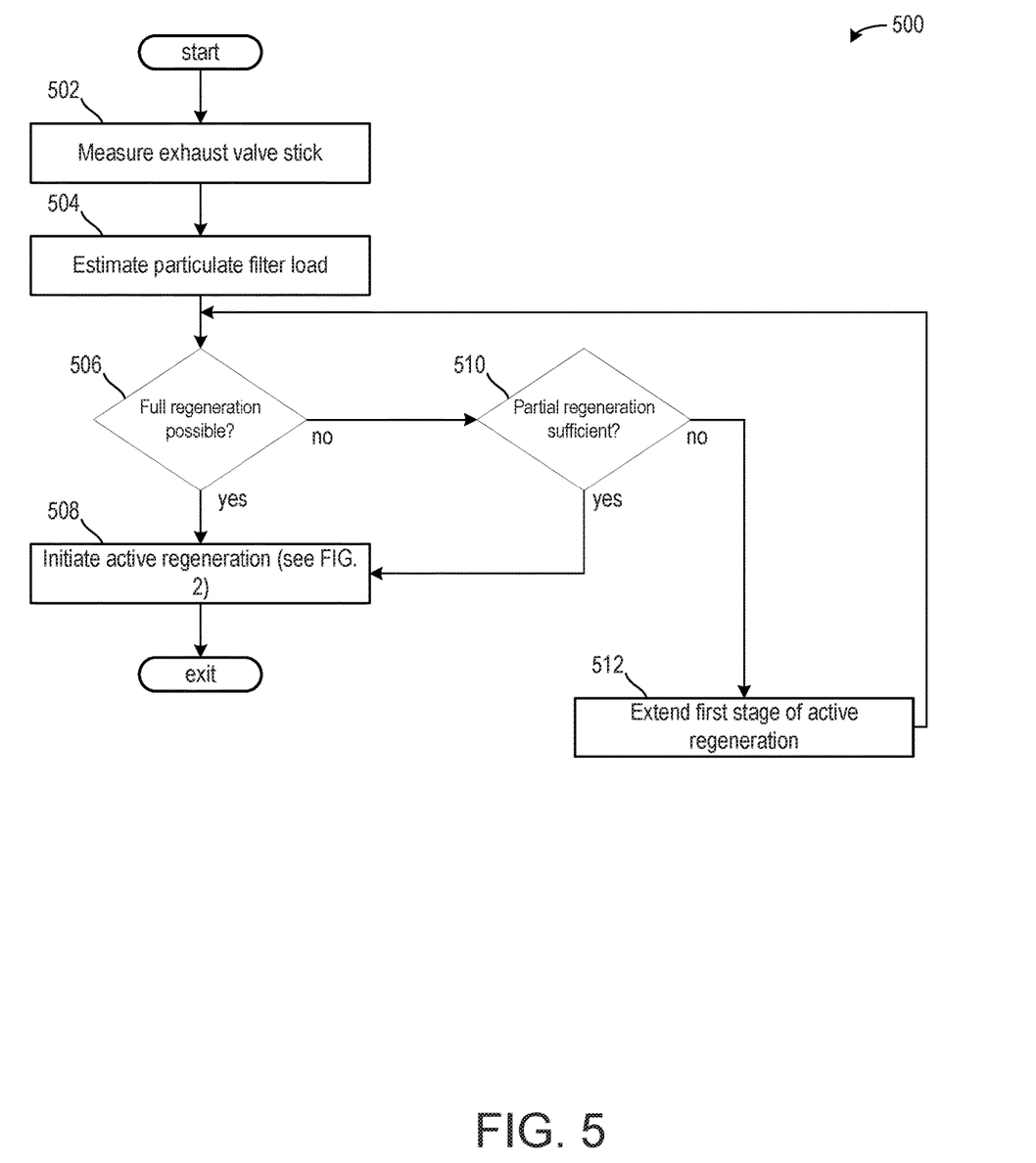
FIG. 5 illustrates a method for adjusting a duration of a first stage of the regeneration based on one or more of an estimated loading of the particulate filter and the valve stickiness.

A plot illustrating a combination of particulate matter and the post-injection during the three stages relative to a risk of valve stickiness increasing is illustrated in FIG. 3. FIG. 4 illustrates a prophetic example of the method of FIG. 2. FIG. 5 illustrates a further example of a method which adjusts a duration of the first stage of the active regeneration in response to a loading of the particulate filter and a valve stickiness prior to the active regeneration. For example, the duration of the first stage is increased in response to the valve stickiness prior to the active regeneration being relatively high. Alternatively, if the valve stickiness is relatively low, then the duration of the first stage may be based on only the oxidation catalyst reaching the first threshold temperature.

Figure 1:
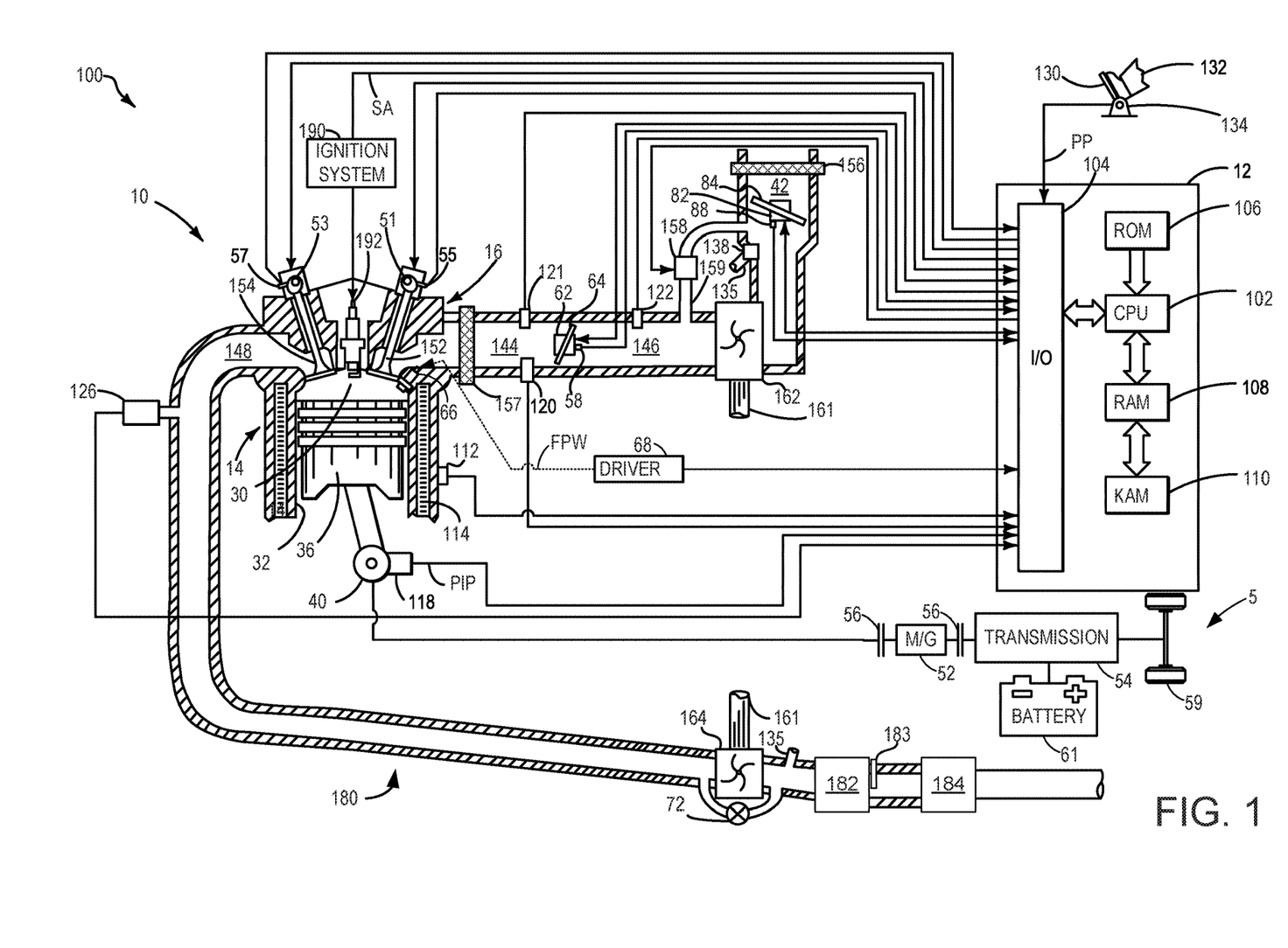
FIG. 1 shows a schematic of an engine for a hybrid vehicle.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In one example, the intake valve 152 and exhaust valves 154 are poppet valves or another type of valve pressed against a corresponding valve seat. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of a first aftertreatment device 182. Alternatively, a two-state exhaust gas oxygen sensor may be substituted for UEGO sensor 126. The first aftertreatment device 182 may be an oxidation catalyst in one example. A sensor 183 may be arranged directly downstream of the first aftertreatment device 182. The sensor 183 may be configured to sample exhaust gas exiting the first aftertreatment device 182. Herein, the sensor 183 is referred to as a temperature sensor. A second aftertreatment device 184 is arranged downstream of the oxidation catalyst 182 and the temperature sensor 183. Herein, the second aftertreatment device 184 is a particulate filter 184 configured to capture particulate matter.

In one example, spark plug 192 may be omitted and the engine 10 may be a compression-ignition engine. As such, injector 66 may be configured to inject diesel fuel. In such an example, the oxidation catalyst 182 is a diesel oxidation catalyst and the particulate filter 184 is a diesel particulate filter. The methods of FIGS. 2 and 5 may be directed, in particular, to a diesel configuration of the vehicle. However, it will be appreciated that the issues corrected below with regard to active regeneration of the particulate filter may also be prevalent to spark-ignited engines.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning now to FIG. 2, it shows a method 200 for executing a regeneration of an aftertreatment device arranged in an exhaust passage of a vehicle. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes determining, estimating, and/or measuring current engine operating parameters. Current engine operating parameters may include one or more of manifold vacuum, throttle position, engine speed, engine temperature, ambient temperature, exhaust temperature, vehicle speed, and air/fuel ratio.

The method 200 proceeds to 204, which includes measuring an exhaust valve stickiness. The exhaust valve stickiness may be a result of particulate matter mixing with wet hydrocarbons (HCs) and sticking to a valve seat corresponding to an exhaust valve and/or to the exhaust valve itself (e.g., such as an exhaust valve of the exhaust valves 154 of FIG. 1). The stickiness may be an estimated stickiness that estimates an amount of adhesive force generated when the exhaust valve is closed and resists opening, and/or an amount of adhesive force generated when the exhaust valve is open and resists closing. The force may be estimated as being along a central axis of the exhaust valve about which the exhaust valve is symmetrically shaped and along which the exhaust valve moves. The adhesive force may be modeled as a combination of friction (static and/or dynamic) and/or spring forces. A degree of stickiness may be estimated based on a combined amount of static friction force and spring forces, with the force rapidly reducing after a threshold amount of exhaust valve movement from rest position. In one example, an amount of exhaust valve stickiness may be based on an estimated accumulated amount of the mixture over time.

The estimated accumulated amount may be based on a mass conservation dynamic model, such as an accumulation model. The accumulation model may estimate an amount of a mixture that may collect onto and/or around the exhaust valve. The model may be based on, along with the air/fuel ratio and post-injection, engine speed, load, intake temperature, gas flow rate, fuel flow rate, and the like, as these factors may contribute and/or subtract from the accumulation of the mixture onto the walls of the exhaust valve and the exhaust seat. The model may estimate, via conservation of mass, a real-time amount of accumulated mixture on the valve/seat given the added mixture and removed mixture, each of which may be mass flows estimated based on the operating conditions noted. Look-up tables with calibrated information may be used to form the flow estimates in one example. The mixture may have an amount of stickiness proportional to an amount of the mixture estimated to be accumulated onto the exhaust valve and/or the exhaust valve seat and/or based on temperature of the mixture and/or composition of the mixture. In one example, an amount of adhesive force may be proportional to a mass of the mixture estimated to be accumulated, wherein the amount of adhesive force increases as the mass of the estimated accumulation of the mixture increases.

The sticky mixture may delay an opening of the exhaust valve and/or decrease an amount of opening, and or decrease a speed of opening of the exhaust valve, resulting in an increased power supply or other actuation force to open the exhaust valve. Additionally, the mixture may block the exhaust valve from sealing (e.g., moving to a fully closed position) with its corresponding valve seat. As such, a combustion chamber may not be fully sealed and contents of the combustion chamber may prematurely leak, thereby decreasing an overall pressure of the cylinder. That is to say, the mixture may accumulate and create a gap between the valve seat and the exhaust valve. An amount of the exhaust valve stickiness may be based on one or more of an in-cylinder pressure, an exhaust profile, and a command pulse. The exhaust valve stickiness may be inversely proportional to the in-cylinder pressure, wherein the in-cylinder pressure is measured as a piston moves from TDC (top-dead-center) of a compression stroke toward BDC (bottom-dead center) of an expansion stroke, wherein comparisons of the in-cylinder pressure are executed with previously acquired pressures at similar piston positions. As such, when the in-cylinder pressure decreases, the exhaust valve stickiness may increase. The exhaust gas profile may be based on one or more of an exhaust gas flow, exhaust gas temperature, exhaust gas pressure, and the like. The exhaust gas profile may be altered based on the exhaust valve stickiness. Furthermore, the exhaust valve stickiness may be estimated in response to a command pulse used to command the exhaust valve open. As a command pulse power increases, the amount of exhaust valve stickiness may also increase.

The method 200 proceeds to 206, which includes determining if an aftertreatment regeneration is desired. In the example of FIG. 2, the aftertreatment regeneration is a regeneration of a diesel particulate filter. However, it will be appreciated that the steps used in the method 200 may be applied to regeneration of other aftertreatment devices needing an increase in exhaust temperature to return to a less loaded, reduced, or oxidized state. Regeneration of the diesel particulate filter may be desired in response to one or more of an exhaust gas backpressure exceeding a threshold backpressure and a duration of time since a previous regeneration exceeding a threshold duration of time. Additionally or alternatively, the regeneration may be periodically performed. If the regeneration is not desired, then the method 200 proceeds to 208, which includes maintaining current operating parameters and does not perform an active regeneration of the aftertreatment device.

If the regeneration is desired, then the method 200 proceeds to 210, which includes entering a first stage of the regeneration. The first stage of the regeneration includes pre-heating the aftertreatment device by adjusting an air/fuel ratio to a rich air/fuel ratio. In one example, the air/fuel ratio is equal to a lambda near or between 1.1 and 1.3. At any rate, the rich air/fuel ratio comprises a lambda value near 1.0 for diesel engines and less than 1.0 for spark-ignited engines. Furthermore, a post-injection amount may be relatively low (e.g., zero) due to a high likelihood of particulate matter mixing with wet hydrocarbon and forming a sticky substance. The first stage further comprises retarding combustion at 214, which may include delaying a primary injection timing. For example, a primary injection that is not retarded may begin at top-dead center during a transition from the compression stroke to the expansion stroke (e.g., after a pilot injection prior to the conclusion of the compression stroke). Retarding the combustion phasing may include injecting the primary injection after top-dead center during the transition relative to a combustion phasing aimed at achieving optimal fuel efficiency. In one example, the primary injection occurs closer to a timing of an exhaust valve opening than to when the piston reaches top-dead center. In spark-ignited engines, retarding combustion may comprise, additionally or alternatively, delaying a spark timing. In this way, exhaust gas temperatures during the first stage of the regeneration may increase. In one example of an engine comprising a particulate filter arranged downstream of an oxidation catalyst, temperatures of the oxidation catalyst and the particulate filter may increase during the first stage. Due to the rich conditions of the first stage of the regeneration and the oxidation catalyst temperature being too low, the oxidation catalyst may not yet be able to oxidize hydrocarbons and further heat the exhaust gas.

The method 200 proceeds to 216, which includes determining if an aftertreatment device temperature is greater than a first threshold temperature. The first threshold temperature may be based on a temperature where the oxidation catalyst is sufficiently hot to oxidize hydrocarbons. Once the oxidation catalyst is a hot enough, then it may begin to exothermically oxidize hydrocarbons and further heat exhaust gas. The temperature of the oxidation catalyst may be directly sensed via a temperature sensor arranged directly downstream thereof. Additionally or alternatively, the temperature sensor may be arranged adjacent to the particulate filter, wherein a temperature of the oxidation catalyst upstream of the particulate filter may be estimated based on data stored in a multi-input look-up table, wherein inputs of the table include one or more of air/fuel ratio, exhaust gas temperature, particulate filter loading, and the like.

If the oxidation catalyst temperature is not greater than the first threshold temperature, then the method 200 proceeds to 218, which comprises continuing the first stage operation and does not proceed to the second stage.

If the oxidation catalyst temperature is greater than the first threshold temperature and the oxidation catalyst is hot enough to exothermically oxidize hydrocarbons, then the method 200 proceeds to 220, which comprises entering a second stage of the regeneration. As such, the first stage of the regeneration is terminated. During the second stage of the regeneration, the air/fuel ratio is increased at 222 and the post-injection amount is increased at 224 to a first amount. The air/fuel ratio may be increased to a relatively lean air/fuel ratio with a lambda between 1.6 and 1.9. In one example, the air/fuel ratio is a measure of an air/fuel ratio including intake air mixing with a primary fuel injection. Thus, the air/fuel ratio may not include the post-injection. The first amount of the post-injection may be increased to a relatively high post-injection amount. As such, the second stage may promote oxidation of fuel from the post-injection at the oxidation catalyst, thereby further increasing a temperature of the particulate filter toward a second threshold temperature, higher than the first threshold temperature. In one example, the post-injection occurs as the exhaust valve is commanded open and/or after a threshold duration following TDC of the piston, wherein the threshold duration is based on a crank angle.

The method 200 proceeds to 226, which includes determining if an aftertreatment device temperature is greater than the second threshold temperature. Herein, the second threshold temperature is referred to as a threshold regeneration temperature. The aftertreatment device temperature may correspond to a temperature of the particulate filter, wherein the temperature of the particulate filter may be directly measured via a temperature sensor arranged adjacent to the particulate filter. Additionally or alternatively, the temperature sensor may be arranged directly downstream of the oxidation catalyst, wherein feedback from the temperature sensor may be used to estimate a temperature of the particulate filter. If the particulate filter temperature is not greater than the threshold regeneration temperature, then the method 200 proceeds to 228 to continue the second stage operation and does not proceed to the third stage.

If the particulate filter temperature is greater than the threshold regeneration temperature, then the method 200 proceeds to 230, which comprises entering a third stage of the regeneration. The third stage of the regeneration may correspond to a stage of the regeneration where it is desired to maintain a temperature of the particulate filter. As such, by the third stage of the regeneration, it is no longer desired to heat the particulate filter. The third stage of the regeneration may comprise decreasing the air/fuel ratio, at 232, relative to the air/fuel ratio during the second stage. In one example, the air/fuel ratio is reduced to a rich air/fuel ratio with a lambda value lower than the lambda during the second stage and greater than the lambda during the first stage. As such, the air/fuel ratio during the third stage is richer than the second stage and leaner than the first stage. In one example, the lambda value during the third stage is between 1.3 to 1.6. The third stage of the regeneration may further comprises decreasing the post-injection amount relative to the amount during the second stage. As described above, the post-injection amount during the second stage may be relatively high. As such, the post-injection amount during the third stage may be between relatively high and relatively low amounts. In this way, the third stage may maintain a temperature of the particulate filter above the threshold regeneration temperature so that particulates may continue to burn off the particulate filter and return the particulate filter to a less loaded condition.

The method 200 proceeds to 236, which comprises measuring an exhaust valve stickiness, which may be substantially similar to 204 described above.

The method 200 proceeds to 238, which comprises determining if a current exhaust valve stickiness, measured at 236, is greater than a pre-regeneration exhaust valve stickiness, measured at 204. If the current exhaust valve stickiness is not greater than the pre-regeneration exhaust valve stickiness, then the method 200 proceeds to 240 to maintain the current balance of the rich air/fuel ratio and the post-injection amount as the particulate matter mixing with the post-injection is not increasing a stickiness of the exhaust valve. The method 200 may continue to compare the exhaust valve stickiness during the regeneration to the exhaust valve stickiness prior to the regeneration.

If the current exhaust valve stickiness is greater than the pre-regeneration exhaust valve stickiness, then the method 200 proceeds to 242 to adjust one or more of the air/fuel ratio and the post-injection amount. In one example, adjusting one or more of the air/fuel ratio and the post-injection amount includes increasing the air/fuel ratio to a leaner air/fuel ratio and decreasing the post-injection amount. As such, an amount of the mixture produced comprising the particulate matter and wet hydrocarbons may be reduced, and a likelihood of the exhaust valve stickiness increasing may be reduced.

The method 200 proceeds to 244, which comprises determining if the exhaust valve stickiness is still increasing. If the exhaust valve stickiness is no longer increasing, which may be determined by an unchanged in-cylinder pressure, exhaust profile, and/or command pulse, then the method 200 proceeds to 246. At 246, the method 200 includes maintaining a current balance of air/fuel ratio and post-injection amount. If the exhaust valve stickiness is increasing, then the method 200 may proceed to 248, which includes terminating regeneration of the aftertreatment device. Additionally or alternatively, the method 200 may further include signaling a cleaning of the exhaust valve. In one example, cleaning the exhaust valve may include operating the engine under conditions similar to the first stage of the regeneration so that the mixture of particulate matter and wet hydrocarbons may be burned off the exhaust valve.

Turning now to FIG. 3, it shows a plot 300 illustrating various ratios of PM mixing with wet HCs during the stages of the regeneration. The circle 310 illustrates a ratio of PM and wet HCs during the first stage. The circle 320 illustrates a ratio of PM and wet HCs during the second stage. The circle 330 illustrates a ratio of PM and wet HCs during the third stage. Herein, circle 310 is referred to as first stage 310, circle 320 is referred to as second stage 320, and circle 330 is referred to as third stage 330. Arc 340 illustrates a region, beyond which, a likelihood of valve stick increasing increases. In one example, additionally or alternatively, the exhaust valve stickiness corresponds to an amount of the substance accumulated onto the exhaust valve and an exhaust valve seat, wherein the substance includes a mixture of particulate matter and wet hydrocarbons. Arc 340 may illustrate a point at which the mixture of the particulate matter and the wet hydrocarbons produces an amount of the substance sufficient to accumulate onto the exhaust valve and its seat to exceed a threshold accumulation amount of the substance, which may lead to the exhaust valve sticking.

Thus, during the first stage 310 where conditions are rich and PM output is high to increase the temperature of the oxidation catalyst to the first threshold temperature, the post-injection amount, which directly corresponds to the amount of wet HCs, may be adjusted to a relatively low amount. In one example, to block formation of the sticky mixture, the post-injection amount is zero.

During the second stage 320, where the air/fuel ratio is lean and PM output is relatively low, the post-injection is increased to a relatively high amount to allow oxidation to take place at the oxidation catalyst. If the exhaust valve begins to stick or if the exhaust valve stickiness increases during the second stage, then the air/fuel ratio may be increased to further decrease the PM output.

During the second stage 330, where air/fuel ratio conditions are slightly rich and post-injection is moderate, each of the air/fuel ratio and the post-injection may be adjusted to mitigate exhaust valve stickiness increasing.

Turning now to FIG. 4, it shows a graph 400 of a prophetic example of the method 200 being executed. Plot 405 illustrates a combustion timing. Plot 410 illustrates an air/fuel ratio. Plot 415 illustrates a post-injection amount. Plot 420 illustrates an exhaust valve stickiness. Dashed line 425 illustrates a first threshold stickiness. Dashed line 430 illustrates a second threshold stickiness. Plot 435 illustrates if an active regeneration is occurring. Plot 440 illustrates a stage of the regeneration. Plot 445 illustrates an aftertreatment device temperature. In one example, the aftertreatment device is an oxidation catalyst, such as oxidation catalyst 182 of FIG. 1. A temperature of the particulate filter, such as particulate filter 184 of FIG. 1, may be estimated based on the oxidation catalyst temperature. Dashed line 450 illustrates the first threshold temperature and dashed line 455 illustrates the threshold regeneration temperature. Time increases from a left to a right side of the figure.

Prior to t1, combustion timing is neither advanced nor delayed (plot 405). The air/fuel ratio is slightly lean (plot 410). The post-injection amount is relatively low (plot 415). The exhaust valve stickiness is less than a first threshold stickiness (plot 420 and dashed line 425, respectively). The regeneration is not active (plot 435). A stage of the regeneration is not selected (plot 440). An aftertreatment device temperature is less than a first threshold temperature (plot 445 and dashed line 450, respectively. At t1, the active regeneration is signaled.

Between t1 and t2, the first regeneration stage is selected. As such, the air/fuel ratio is decreased to a rich air/fuel ratio. To further increase exhaust gas temperatures, the combustion timing is retarded via a delay of a primary fuel injection. As such, the aftertreatment device temperature increases toward the first threshold temperature. Additionally, due to a high temperature of exhaust gas during the first stage, the exhaust valve stickiness may decrease. At t2, the aftertreatment device temperature is equal to the first threshold temperature and the regeneration stage switches from the first stage to the second stage.

Between t2 and t3, the second stage of the regeneration comprises increasing the air/fuel ratio to a lean air/fuel ratio and increasing the post-injection amount to a relatively high amount. The aftertreatment device temperature continues to increase from the first threshold temperature to the threshold regeneration temperature (dashed line 455). The threshold regeneration temperature in the example of FIG. 4 illustrates a temperature of the oxidation catalyst indicative of a temperature of the particulate filter being high enough to burn particulates. The second stage may further comprise the exhaust valve stickiness increasing due to mixing between wet HCs from the post-injection and particulate matter formed during combustion. At t3, the aftertreatment device temperature is equal to the regeneration temperature and the third stage is selected.

Between t3 and t4, the third stage comprises an amount of post-injection between the high and low amounts. The air/fuel ratio during the third stage is slightly rich. The exhaust valve stickiness increases due to the mixing of wet HCs from the post-injection and particulate matter. The aftertreatment device temperature remains substantially equal to the threshold regeneration temperature, thereby indicating particulates are being removed from the particulate filter. At t4, the exhaust valve stickiness is equal to the first threshold stickiness. In one example, the first threshold stickiness may correspond to a stickiness where an increase in stickiness from the first threshold stickiness may begin to impact valve and engine performance.

Between t4 and t5, the third regeneration stage continues, however, the post-injection amount is reduced to decrease an amount of the sticky mixture generated by mixing the wet HCs and the PM. Due to the reduction in post-injection amount, the exhaust valve stickiness remains equal to the first threshold. As such, the regeneration may continue. If the exhaust valve stickiness were to continue to increase to the second threshold stickiness (dashed line 430), then the regeneration would be terminated. At t5 and thereafter, the active regeneration continues with the third stage selected until the regeneration is no longer desired or until the exhaust valve stickiness exceeds the first threshold stickiness.

Turning now to FIG. 5, it shows a method 500 for determining if a regeneration will be terminated before a desired completion point is reached due to the exhaust valve stickiness increasing beyond a threshold stickiness (e.g., the first threshold stickiness of FIG. 4). The method 500 may be predicated on a condition where particulate filter regeneration is signaled in response to a particulate filter load exceeding a threshold load such that exhaust backpressure is affecting engine efficiency and/or the particulate filter is no longer able to capture particulates. However, it will be appreciated that the method 500 may also be executed for intermittent (e.g., scheduled) regenerations of the particulate filter.

The method 500 begins at 502, which includes measuring the exhaust valve stickiness, which is similar to 204 of FIG. 2.

The method 500 proceeds to 504, which includes estimating a particulate filter load. Estimating the particulate filter load may include feedback from an exhaust pressure sensor measuring exhaust backpressure. As the particulate load increases, exhaust gas may flow through the particulate filter less freely, thereby increasing the exhaust backpressure. Additionally or alternatively, the particulate filter load may be estimated based on data stored in a multi-input look-up table, wherein the inputs include but are not limited to engine load, air/fuel ratio, post-injection amount, duration of previous regeneration, duration since a previous regeneration, exhaust backpressure, and the like. In one example, as the duration since the previous regeneration increases, the estimated load of the particulate filter also increases.

The method 500 proceeds to 506, which includes determining if a full regeneration is possible. The full regeneration may comprise where the particulate filter load is reduced to a relatively unloaded state (e.g., substantially zero load). The full regeneration may be possible if exhaust valve stickiness will not limit a duration of the regeneration. Additionally or alternatively, if the particulate filter load is pretty low, then the duration of the full regeneration is relatively low. In one example, the particulate filter load is compared to the exhaust valve stickiness, if each value is relatively high, then a full regeneration may not be possible. For example, if the particulate filter load is substantially equal to 90% loaded, then data in a look-up table may comprise a full regeneration duration for a 90% loaded particulate filter. The look-up table may further comprise data regarding an amount of stickiness accumulated onto the exhaust valve during prior full regenerations of the particulate filter at a 90% load. If the current stickiness of the valve combined with the predicted amount of stickiness that will accumulate onto the exhaust valve during the full regeneration will exceed the first threshold stickiness, then the full regeneration may not be possible. However, if the first threshold stickiness will not be exceeded, then the full regeneration may be possible.

If the full regeneration is possible, then the method 500 proceeds to 508 to initiate an active regeneration as described in method 200 of FIG. 2. If the full regeneration is not possible, then the method 500 proceeds to 510 to determine if a partial regeneration is possible. The partial regeneration may be possible based on a current exhaust valve stickiness. If the current exhaust valve stickiness is below the first threshold stickiness, then the partial regeneration may occur as the regeneration of method 200 may be adjusted to block additional formation of the sticky substance (e.g., the mixture of the particulate matter and wet HCs).

If the partial regeneration is not possible, then the method 500 proceeds to 512 to extend a first stage of the active regeneration. By extending a duration of the first stage of the active regeneration, the sticky substance formed on the exhaust valve and the exhaust valve seat may be burned off due to elevated temperatures of the first stage. In some examples, the duration of the first stage may be based on the exhaust valve stickiness, wherein as the exhaust valve stickiness increases, the duration of the first stage increases.

In this way, regeneration of a particulate filter may be adjusted based on a sensed stickiness of an exhaust valve. The duration of the regeneration may be extended by minimizing an amount of a sticky substance formed during the regeneration. The technical effect of minimizing formation of the sticky substance during the regeneration is to decrease the exhaust valve sticking and maintain combustion efficiency. Additionally, the regeneration may be extended to allow the particulate filter to fully regenerate, thereby improving particulate filter performance and decreasing emissions.

An embodiment of a system, comprises a particulate filter arranged in an exhaust passage of an engine and a controller with computer-readable instructions stored on non-transitory memory thereof that when executed enable the controller to adjust regeneration conditions of the particulate filter to decrease formation of a mixture comprising particulate matter and wet hydrocarbons in response to a stickiness of an exhaust valve.

A first example of the system further includes where the particulate filter is a diesel particulate filter arranged downstream of a diesel oxidation catalyst relative to a direction of exhaust gas flow through the exhaust passage.

A second example of the system, optionally including the first example, further comprises where instructions further enable the controller to initiate a first stage of the regeneration comprising a rich air/fuel ratio and retarded combustion timing, wherein a second stage of the regeneration is initiated subsequent the first stage in response to a temperature of the diesel oxidation catalyst exceeding a first threshold temperature, wherein the second stage comprises a lean air/fuel ratio and a first amount of a post-injection, wherein a third stage of the regeneration is initiated subsequent the second stage in response to a temperature of the diesel oxidation catalyst exceeding a second threshold temperature, wherein the third stage comprises a rich air/fuel ratio and a second amount of the post-injection which is less than the first amount.

A third example of the system, optionally including one or more of the previous examples, further includes where the particulate matter increases when the air/fuel ratio decreases, and wherein an amount of the wet hydrocarbons increases as a post-injection amount increases.

A fourth example of the system, optionally including one or more of the previous examples, further includes where instructions further enable the controller to one or more of increase the air/fuel ratio and decrease the post-injection amount in response to the stickiness of the exhaust valve increasing.

A fifth example of the system, optionally including one or more of the previous examples, further includes where the stickiness of the exhaust valve is based on an amount of the mixture accumulated on one or more of the exhaust valve and an exhaust valve seat.

A sixth example of the system, optionally including one or more of the previous examples, further includes where the stickiness of the exhaust valve is estimated based on one or more of an in-cylinder pressure, an exhaust gas profile, and a command pulse.

A seventh example of the system, optionally including one or more of the previous examples, further includes where the stickiness of the exhaust valve increases as the in-cylinder pressure decreases.

An eighth example of the system, optionally including one or more of the previous examples, further includes where the stickiness of the exhaust valve increases as a power of the command pulse increases.

An embodiment of a method comprises adjusting an air/fuel ratio and a post-injection amount to decrease a mixing of particulate matter and wet hydrocarbons in response to a stickiness of an exhaust valve increasing during regeneration of an aftertreatment device.

A first example of the method further comprises where adjusting the air/fuel ratio and the post-injection amount comprises increasing the air/fuel ratio to decrease an amount of particulate matter produced and decreasing the post-injection amount to decrease an amount of wet hydrocarbons.

A second example of the method, optionally including the first example, further includes where injecting the post-injection after a primary injection, the post-injection beginning at a start of an opening of the exhaust valve.

A third example of the method, optionally including one or more of the previous examples, further includes where estimating the stickiness based on a power used to command the exhaust valve open, wherein the stickiness increases as the power increases.

A fourth example of the method, optionally including one or more of the previous examples, further includes where estimating the stickiness based on an in-cylinder pressure, wherein the stickiness increases as the in-cylinder pressure decreases.

A fifth example of the method, optionally including one or more of the previous examples, further includes where the aftertreatment device is a particulate filter arranged downstream of an oxidation catalyst.

An embodiment of a system comprises a diesel engine fluidly coupled to an exhaust passage comprising a diesel oxidation catalyst upstream of a diesel particulate filter and a controller comprising computer-readable instructions stored on no-transitory memory thereof that when executed enable the controller to initiate an active regeneration of the diesel particulate filter in response to an exhaust backpressure exceeding a threshold backpressure, initiate a first stage of the active regeneration, wherein the first stage comprises a rich air/fuel ratio and a retarded combustion phasing, initiate a second stage of the active regeneration in response to a temperature of the diesel oxidation catalyst exceeding a first threshold temperature during the first stage, wherein the second stage comprises a lean air/fuel ratio and a first post-injection amount, initiate a third stage of the active regeneration in response to a temperature of the diesel particulate filter exceeding a second threshold temperature, higher than the first threshold temperature, during the second stage, wherein the third stage comprises a rich air/fuel ratio and a second post-injection amount less than the first post-injection amount, and adjust the air/fuel ratio and post-injection amount during one or more of the first, second, and third stages in response to an amount of a substance accumulated to one or more of an exhaust valve and an exhaust valve seat of the diesel engine exceeding a threshold substance amount.

A first example of the system further comprises where the substance is a mixture of particulate matter and wet hydrocarbons, and wherein the substance is configured to delay an opening of the exhaust valve and block the exhaust valve from moving to a fully closed position when the amount of the substance exceeds the threshold substance amount.

A second example of the system, optionally including the first example, further comprises where the instructions further enable the controller to extend a duration of the first stage in response to the amount of the substance accumulated exceeding the threshold substance amount prior to the active regeneration.

A third example of the method, optionally including one or more of the previous examples, further includes where the duration of the first stage is extended proportionally to the amount of the substance, wherein as the amount of the substance increases the duration of the first stage increases.

A fourth example of the method, optionally including one or more of the previous examples, further includes where the first threshold temperature represents a temperature the diesel oxidation catalyst is configured to oxidize hydrocarbons, and wherein the second threshold temperature represents a temperature at which the diesel particulate filter begins to regenerate and burns particulates off therefrom.

In another representation, the engine is a diesel engine arranged in a hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a particulate filter arranged in an exhaust passage of an engine; and
a controller with computer-readable instructions stored on non-transitory memory thereof that when executed enable the controller to:
adjust regeneration conditions of the particulate filter to decrease formation of a mixture comprising particulate matter and wet hydrocarbons in response to a stickiness of an exhaust valve.

2. The system of claim 1, wherein the particulate filter is a diesel particulate filter arranged downstream of a diesel oxidation catalyst relative to a direction of exhaust gas flow through the exhaust passage.

3. The system of claim 2, wherein instructions further enable the controller to initiate a first stage of the regeneration comprising a rich air/fuel ratio and retarded combustion timing, wherein a second stage of the regeneration is initiated subsequent the first stage in response to a temperature of the diesel oxidation catalyst exceeding a first threshold temperature, wherein the second stage comprises a lean air/fuel ratio and a first amount of a post-injection, wherein a third stage of the regeneration is initiated subsequent the second stage in response to a temperature of the diesel oxidation catalyst exceeding a second threshold temperature, wherein the third stage comprises a rich air/fuel ratio and a second amount of the post-injection which is less than the first amount.

4. The system of claim 1, wherein the particulate matter increases when the air/fuel ratio decreases, and wherein an amount of the wet hydrocarbons increases as a post-injection amount increases.

5. The system of claim 4, wherein instructions further enable the controller to one or more of increase the air/fuel ratio and decrease the post-injection amount in response to the stickiness of the exhaust valve increasing.

6. The system of claim 1, wherein the stickiness of the exhaust valve is based on an amount of the mixture accumulated on one or more of the exhaust valve and an exhaust valve seat.

7. The system of claim 1, wherein the stickiness of the exhaust valve is estimated based on one or more of an in-cylinder pressure, an exhaust gas profile, and a command pulse.

8. The system of claim 7, wherein the stickiness of the exhaust valve increases as the in-cylinder pressure decreases.

9. The system of claim 7, wherein the stickiness of the exhaust valve increases as a power of the command pulse increases.

10. A method, comprising:
adjusting an air/fuel ratio and a post-injection amount to decrease a mixing of particulate matter and wet hydrocarbons in response to an estimated stickiness of an exhaust valve increasing during regeneration of an aftertreatment device.

11. The method of claim 10, wherein adjusting the air/fuel ratio and the post-injection amount comprises increasing the air/fuel ratio to decrease an amount of particulate matter produced and decreasing the post-injection amount to decrease an amount of wet hydrocarbons.

12. The method of claim 10, further comprising injecting the post-injection after a primary injection, the post-injection beginning at a start of an opening of the exhaust valve.

13. The method of claim 10, further comprising estimating the stickiness based on a power used to command the exhaust valve open, wherein the stickiness increases as the power increases.

14. The method of claim 10, further comprising estimating the stickiness based on an in-cylinder pressure, wherein the stickiness increases as the in-cylinder pressure decreases.

15. The method of claim 10, wherein the aftertreatment device is a particulate filter arranged downstream of an oxidation catalyst.

16. A system, comprising:
a diesel engine fluidly coupled to an exhaust passage comprising a diesel oxidation catalyst upstream of a diesel particulate filter; and
a controller comprising computer-readable instructions stored on no-transitory memory thereof that when executed enable the controller to:
initiate an active regeneration of the diesel particulate filter in response to an exhaust backpressure exceeding a threshold backpressure;
initiate a first stage of the active regeneration, wherein the first stage comprises a rich air/fuel ratio and a retarded combustion phasing;
initiate a second stage of the active regeneration in response to a temperature of the diesel oxidation catalyst exceeding a first threshold temperature during the first stage, wherein the second stage comprises a lean air/fuel ratio and a first post-injection amount;
initiate a third stage of the active regeneration in response to a temperature of the diesel particulate filter exceeding a second threshold temperature, higher than the first threshold temperature, during the second stage, wherein the third stage comprises a rich air/fuel ratio and a second post-injection amount less than the first post-injection amount; and
adjust the air/fuel ratio and post-injection amount during one or more of the first, second, and third stages in response to an amount of a substance accumulated to one or more of an exhaust valve and an exhaust valve seat of the diesel engine exceeding a threshold substance amount.

17. The system of claim 16, wherein the substance is a mixture of particulate matter and wet hydrocarbons, and wherein the substance is configured to delay an opening of the exhaust valve and block the exhaust valve from moving to a fully closed position when the amount of the substance exceeds the threshold substance amount.

18. The system of claim 16, wherein the instructions further enable the controller to extend a duration of the first stage in response to the amount of the substance accumulated exceeding the threshold substance amount prior to the active regeneration.

19. The system of claim 16, wherein the duration of the first stage is extended proportionally to the amount of the substance, wherein as the amount of the substance increases the duration of the first stage increases.

20. The system of claim 16, wherein the first threshold temperature represents a temperature the diesel oxidation catalyst is configured to oxidize hydrocarbons, and wherein the second threshold temperature represents a temperature at which the diesel particulate filter begins to regenerate and burns particulates off therefrom.

* * * * *